United States Patent
Engle

[15] 3,672,633
[45] June 27, 1972

[54] VENT VALVE
[72] Inventor: Thomas H. Engle, Cape Vincent, N.Y.
[73] Assignee: General Signal Corporation
[22] Filed: Sept. 14, 1970
[21] Appl. No.: 71,937

[52] U.S. Cl..............................................251/304, 137/83
[51] Int. Cl..................................................F16k 11/02
[58] Field of Search..................251/172, 175, 282, 283, 304, 251/180; 137/596, 596.2, 83, 625.21

[56] References Cited

UNITED STATES PATENTS

| | | | |
|---|---|---|---|
| 2,349,822 | 5/1944 | Gardner | 251/180 X |
| 2,732,860 | 1/1956 | Ray | 251/282 X |
| 2,780,833 | 2/1957 | Braunlich | 251/206 X |
| 2,982,902 | 5/1961 | Le Gates et al. | 137/83 X |
| 3,404,864 | 10/1968 | Reddy | 251/172 |
| 3,536,087 | 10/1970 | Allen | 137/82 |

Primary Examiner—Henry T. Klinksiek
Attorney—Dodge & Ostmann

[57] ABSTRACT

The disclosure concerns a sensitive vent valve for controlling the escape of air from a pressurized chamber. The valve comprises a tubular seat, and a rotary plate which slides across one end of the seat and contains a through port which is selectively brought into registration with the seat. The port has a short upstream portion and a longer and enlarged downstream portion so that the air which enters the port and expands therein will exert only minimal tangentially directed forces on the plate.

3 Claims, 3 Drawing Figures

PATENTED JUN 27 1972
3,672,633
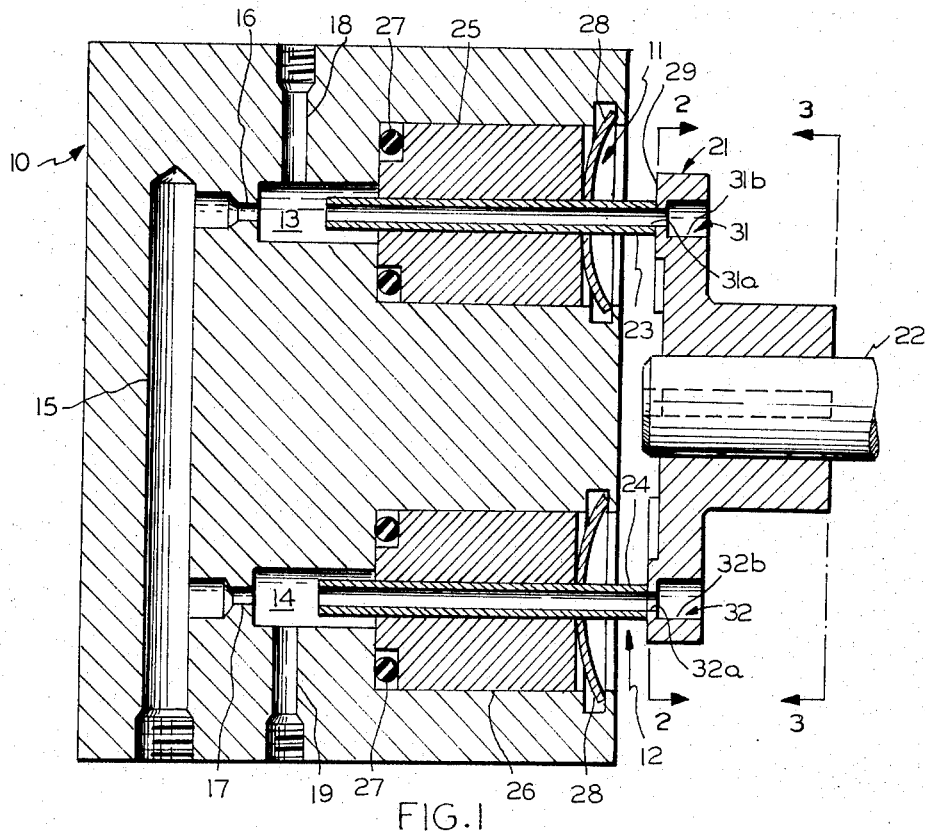
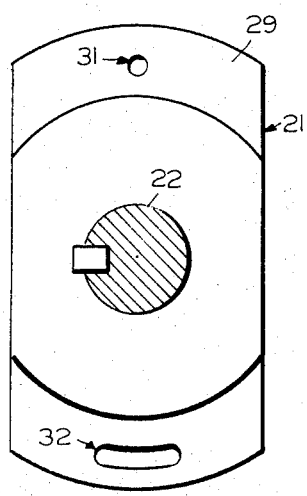
FIG. 2
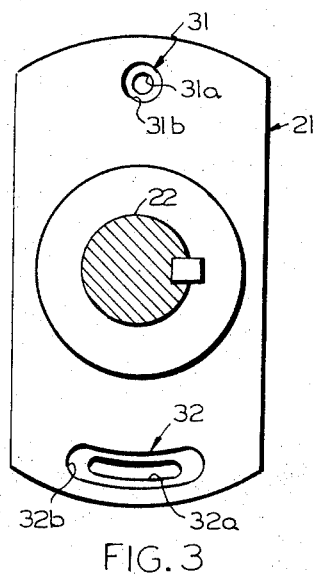
FIG. 3
INVENTOR
THOMAS H. ENGLE
BY Dodge & Ostmann
ATTORNEYS

VENT VALVE

BACKGROUND AND SUMMARY OF THE INVENTION

Applications Ser. No. 761,656, filed Sept. 23, 1968 (now U.S. Pat. No. 3,528,709, granted Sept. 15, 1970); Ser. No. 794,122, filed Jan. 27, 1969 (now U.S. Pat. No. 3,536,360, granted Oct. 27, 1970); and Ser. No. 807,295, filed Mar. 14, 1969 (now U.S. Pat. No. 3,536,361, granted Oct. 27, 1970), disclose self-balancing control systems in which input and feedback signals, in the form of torques, are algebraically combined by a rotary comparator shaft which actuates two pilot valves arranged to effect corrective action through main supply and exhaust valves. The pilot valves control the exhaust of compressed air from piloting chambers, and each comprises a floating tubular seat which is pressure biased into endwise abutment with a ported disc or plate carried by the comparator shaft. The ports in the plate extend through it to the atmosphere, and each is positioned to register with the associated tubular seat during the appropriate range of motion of the comparator shaft. Thus, when registration occurs, air in the piloting chamber escapes to the atmosphere through the associated seat and port, and the pressure in the piloting chamber reduces to a low level.

Experience with this control apparatus led to the discovery that the pilot valves themselves imposed torques on the comparator shaft which adversely affected the performance of the system. Study of this problem leads me to conclude that, as a port in the rotary plate moves into registration with the associated tubular seat, the high energy jet of air which enters the port expands and develops on the adjacent port wall an unbalanced tangential force. Since the ports in the plate are eccentric to the axis of the comparator shaft, the tangential force gives rise to a spurious torque on the shaft. Although this torque is not great in the absolute sense, it is sufficiently large relative to the real input and feedback torques to disturb the torque balance which the apparatus is intended to achieve and maintain.

The object of this invention is to eliminate, or at least reduce to a tolerable level, the unbalanced fluid pressure forces which act in the direction of movement of the ported plate. According to the invention, this goal is achieved by dividing each port in the plate into two portions, one being a short upstream portion adjacent the plate face which coacts with the tubular seat and which is sized and shaped as in the prior valve, and the second being a downstream portion which has a greater length than the first and is enlarged in cross section at least in the direction of movement of the plate. This arrangement reduces the area of the port wall immediately adjacent the high energy air jet which enters the port from the tubular seat, and also increases the volume of the port and thereby encourages dissipation of the energy in the jet. As a result, the magnitude of the unbalanced fluid pressure force developed on the port wall is materially decreased.

BRIEF DESCRIPTION OF THE DRAWINGS

The preferred embodiment of the invention is described herein with reference to the accompanying drawing in which:

FIG. 1 is an axial sectional view of a pilot valve unit incorporating two of the improved vent valves.

FIGS. 2 and 3 are sectional views taken, respectively, on lines 2—2 and 3—3 of FIG. 1.

DETAILED DESCRIPTION OF PREFERRED EMBODIMENT

The illustrated pilot valve unit 10 is designed for use in systems of the type described in the patent applications mentioned earlier and includes a pair of vent valves 11 and 12 arranged to control the exhaust of compressed air from the pilot chambers 13 and 14, respectively. These chambers receive compressed air from a supply passage 15 through one or the other of a pair of orifices 16 and 17 and are provided with outlet passages 18 and 19, respectively, through which they communicate with the piloted pressure motors which unit 10 is intended to control.

The vent valves 11 and 12 employ a common head, in the form of a hardened steel disc or plate 21 which is keyed to rotate with comparator shaft 22, and each also includes a floating tubular seat 23 or 24 which is made of graphite and is guided for free sliding movement in a direction parallel with the axis of shaft 22 by a brass block 25 or 26. The guide blocks are provided with O-ring seals 27 and are held in the body of unit 10 by dished spring rings 28. The tubular seats 23 and 25 are urged into abutment with the flat, lapped front face 29 of plate 21 by the pressures in the associated chambers 13 and 14; however, since the cross sectional area of each seat which is subject to the biasing pressure is equal to the contact area of the seat and plate 21, it will be understood that the seats are essentially pressure balanced.

Plate 21 is pierced by two through ports 31 and 32 which are parallel with the axis of shaft 22 and are located and shaped to register with tubular seats 23 and 24, respectively, during preselected ranges of movement of comparator shaft 22. It should be evident that registration of a port and a seat allows escape to atmosphere of the compressed air in the associated chamber 13 or 14 and thus effects dissipation of the pressure in the chamber. The effect of this action and the sequence in which chambers 13 and 14 are pressurized and vented are fully described in the aforementioned patent applications and need be repeated here. However, it is important to consider the structure of the vent ports themselves. In contrast to the ports in the earlier valves, which have uniform cross sections throughout their lengths, the ports 31 and 32 of valves 11 and 12 are divided into two portions of different cross sectional areas. Thus, port 31 has a short upstream portion 31a of the usual size and shape, and a longer and enlarged downstream portion 31b. Similarly, port 32 is provided with corresponding portions 32a and 32b. The relative lengths and cross sectional areas of the two portions of each port are not critical, but obviously it is desirable to make the downstream portions 31b and 32b as long and as large as other design considerations, such as strength and resistance to deflection, permit.

The illustrated valve unit 10 is suited to use in applications wherein comparator shaft 22 may rotate in either direction from the illustrated position, so the upstream and downstream portions of each of the ports 31 and 32 have similar cross sectional shapes and are symmetrical about the same axis. In applications wherein only unidirectional operation is required, the downstream portion 31b or 32b may be offset toward the associated seat 23 or 24. For example, if shaft 22 moves only in the clockwise direction from the FIG. 3 position, the downstream port portions 31b and 32b could be offset in the opposite direction relatively to the upstream portions 31a and 32a, respectively. It also should be noted that while enlargement of the downstream port portions in the circumferential direction will satisfy the purpose of the invention, it usually is most convenient from the manufacturing standpoint to enlarge each port around its entire circumference as shown in the drawings. Finally, it should be mentioned that while the invention has been described in connection with a valve employing a rotary head, it can be employed usefully in units where the head moves linearly.

I claim:

1. A vent valve 10 of the kind including a movable plate 21 having a front face 29 which slides across one end of a tubular seat 23 or 24 and which contains a through port 31 or 32 arranged to be moved into registration with the seat, and characterized in that the through port 31 or 32 is divided by a step into two portions 31a, 31b or 32a, 32b having different dimensions at least in the direction of movement of the plate, there being an upstream portion 31a or 32a which extends into the plate 21 from said front face 29, and an enlarged downstream portion 31b or 32b.

2. A vent valve as defined in claim 1 in which the upstream portion 31a or 32a is shorter than the downstream portion 31b or 32b.

3. A vent valve as defined in claim 2 in which the two portions 31a, 31b or 32a, 32b have similar cross sections and are symmetrical about a common axis.

* * * * *